(12) United States Patent
Ionkin

(10) Patent No.: US 8,470,287 B2
(45) Date of Patent: Jun. 25, 2013

(54) PREPARATION OF COPPER ZINC TIN SULFIDE

(75) Inventor: Alex Sergey Ionkin, Kennett Square, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/505,818

(22) PCT Filed: Nov. 22, 2010

(86) PCT No.: PCT/US2010/057562
§ 371 (c)(1),
(2), (4) Date: May 3, 2012

(87) PCT Pub. No.: WO2011/066203
PCT Pub. Date: Jun. 3, 2011

(65) Prior Publication Data
US 2012/0219491 A1    Aug. 30, 2012

Related U.S. Application Data

(60) Provisional application No. 61/264,409, filed on Nov. 25, 2009.

(51) Int. Cl.
*C01B 17/00* (2006.01)
*C01B 19/00* (2006.01)

(52) U.S. Cl.
USPC .......................................... 423/508; 423/511

(58) Field of Classification Search
USPC .................................................. 423/508, 511
See application file for complete search history.

(56) References Cited

U.S. PATENT DOCUMENTS

| | | | |
|---|---|---|---|
| 3,681,067 A | 8/1972 | Hanada | |
| 2011/0094557 A1* | 4/2011 | Mitzi et al. | 136/244 |
| 2011/0097496 A1* | 4/2011 | Mitzi et al. | 427/256 |
| 2012/0138866 A1* | 6/2012 | Agrawal et al. | 252/501.1 |
| 2012/0219797 A1* | 8/2012 | Mitsumoto et al. | 428/402 |

FOREIGN PATENT DOCUMENTS

| | | |
|---|---|---|
| CN | 101026198 A | 8/2007 |
| CN | 101452969 A | 6/2009 |
| CN | 101565313 A | 10/2009 |
| JP | 2007269589 A | 10/2007 |
| WO | 2009061190 A2 | 5/2009 |
| WO | 2010006623 A2 | 1/2010 |

OTHER PUBLICATIONS

Fiechter, S. et al., Phase relations and optical properties of semiconducting ternary sulfides in the system Cu-Sn-S, Journal of Physics and Chemistry of Solids, 2003, pp. 1859-1862, vol. 64.

Hall, S. R. et al., Kesterite, Cu2(Zn,Fe)SnS4, and Stannite, Cu2(Fe,Zn)SnS4, Structurally Similar but Distinct Minerals, Canadian Mineralogist, 1978, pp. 131-137, vol. 16.

Katagiri, Hironori et al., Preparation and evaluation of Cu2ZnSnS4 thin films by sulfurization of E-B evaporated precursors, Solar Energy Materials and Solar Cells, 1997, pp. 407-414, vol. 49.

(Continued)

*Primary Examiner* — Timothy Vanoy

(57) ABSTRACT

The present invention relates to synthesis of copper zinc tin sulfide, $Cu_2ZnSnS_4$. Copper zinc tin sulfide is useful as an absorber material in a thin film solar cell application.

9 Claims, 2 Drawing Sheets

OTHER PUBLICATIONS

Katagiri, Hironori et al., Development of CZTS-based thin film solar cells, Thin Solid Films, 2009, pp. 2455-2460, vol. 517.

Moh, Gunther H., Tin-Containing Mineral Systems, Part II: Phase relations and mineral assemblages in the Cu-Fe-Zn-Sn-S system, Chem. Erde Bd. 34, 1975, pp. 1-61.

Moriya, Katsuhiko et al., Characterization of Cu2ZnSnS4 thin films prepared by photo-chemical deposition, Phys. Stat. Sol. C, 2006, pp. 2848-2852, vol. 3, No. 8.

Nakayama, Norio et al., Sprayed films of stannite Cu2ZnSnS4, Applied Surface Science, 1996, pp. 171-175, vol. 92.

Riha, Shannon C. et al., Solution-Based Synthesis and Characterization of Cu2ZnSnS4, Nanocrystals, Journal of American Chemical Society, 2009, pp. 12054-12055, vol. 131.

Schorr, Susan et al., In-situ investigation of the kesterite formation from binary and ternary sulphides, Thin Solid Films, 2009, pp. 2461-2464, vol. 517.

Schorr, Susan et al., Structure and phase relations in the 2(CuInS2)-Cu2ZnSnS4 solid solution system, Thin Solid Films, 2009, pp. 2508-2510, vol. 517.

Todorov, T. et al., Cu2ZnSnS4 films deposited by a soft-chemistry method, Thin Solid Films, 2009, pp. 2541-2544, vol. 517.

Weber, Alfons et al., In-situ XRD on formation reactions of Cu2ZnSnS4 thin films, Physica Status, Solidi C, 2009, pp. 1245-1248, vol. 6, No. 5.

* cited by examiner

PREPARATION OF COPPER ZINC TIN SULFIDE

CROSS REFERENCE TO RELATED APPLICATIONS

This application claims priority under 35 U.S.C. §119(e) from, and claims the benefit of, the following U.S. Provisional Application: No. 61/264,409 filed on Nov. 25, 2009, and which is by this reference incorporated in its entirety as a part hereof for all purposes.

FIELD OF THE INVENTION

The present invention relates to synthesis of copper zinc tin sulfide, $Cu_2ZnSnS_4$. Copper zinc tin sulfide is useful as an absorber material in a thin film solar cell application.

BACKGROUND

Solar cells, also termed photovoltaic or PV cells, and solar modules convert sunlight into electricity. These electronic devices have been traditionally fabricated using silicon (Si) as a light-absorbing, semiconducting material in a relatively expensive production process. To make solar cells more economically viable, solar cell device architectures have been developed that can inexpensively make use of thin-film, light-absorbing semiconductor materials such as copper-indium-gallium-sulfo-di-selenide, $Cu(In, Ga)(S, Se)_2$, also termed CIGS. This class of solar cells typically has a p-type absorber layer sandwiched between a back electrode layer and an n-type junction partner layer. The back electrode layer is often Mo, while the junction partner is often CdS. A transparent conductive oxide (TCO) such as zinc oxide doped with aluminum is formed on the junction partner layer and is typically used as a transparent electrode.

Despite the demonstrated potential of CIGS in thin-film solar cells, the toxicity and low abundance of indium and selenium are major impediments to the widespread use and acceptance of CIGS in commercial devices. An attractive alternative for absorber layers of thin film solar cells are quaternary chalcogenide, particularly copper zinc tin sulfide, $Cu_2ZnSnS_4$ (CZTS). It has a direct bandgap of about 1.5 eV and an absorption coefficient greater than 104 cm$^{-1}$. In addition, CZTS does not include any toxic or nonabundant elements.

Thin films of CZTS have been prepared via sputtering of Cu, SnS, and ZnS precursors, hybrid sputtering, pulsed laser deposition, spray pyrolysis of halides and thiourea complexes, electrodeposition/thermal sulfurization, E-beam Cu/Zn/Sn/thermal sulfurization, and sol-gel deposition, followed by thermal sulfurization.

Bulk quantities of CZTS have been prepared in evacuated quartz ampoules at temperatures between 400° C. to 1150° C. Bulk quantities have also been prepared in a furnace with a source of sulfur, such as $H_2S$.

There is a need for a safe, robust process to produce CZTS in bulk quantities for non-vacuum based thin-film photovoltaics.

DETAILED DESCRIPTION

Figure 1A:
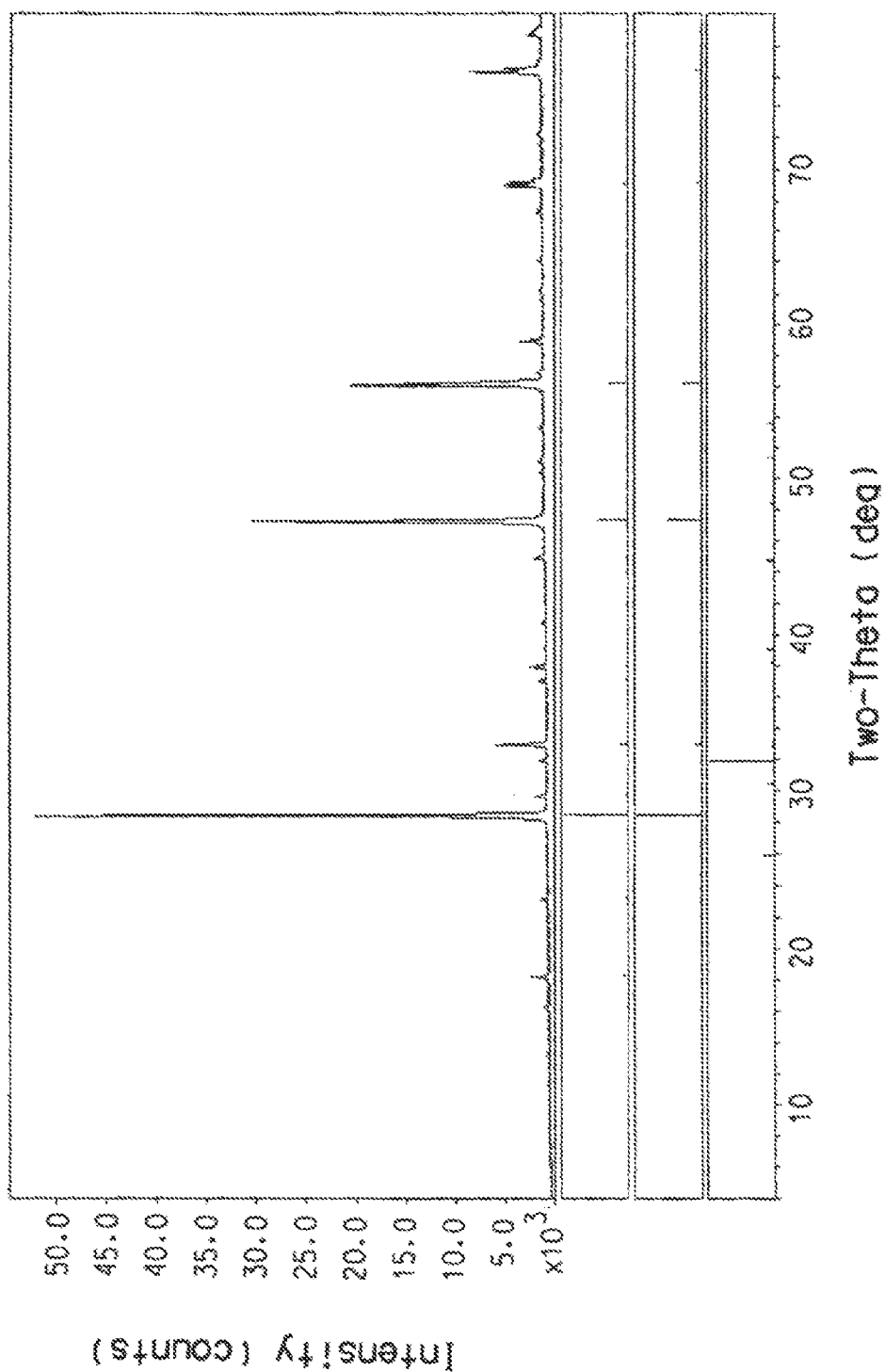
FIGS. 1A and 1B are x-ray powder diffraction patterns of the CZTS prepared in one embodiment.

Disclosed herein is a method, comprising the steps of:
a) providing a precursor mixture comprising:
  i) a copper sulfide, a zinc sulfide, and a tin sulfide;
  ii) a copper tin sulfide and a zinc sulfide;
  iii) a copper zinc sulfide and a tin sulfide; or
  iv) a zinc tin sulfide and a copper sulfide;
  wherein the precursor mixture has a total molar ratio of Cu:Zn:Sn:S of about 2:1:1:4; and
b) heating the precursor mixture in an inert atmosphere to a temperature of about 300° C. to about 1000° C.

The method can prepare CZTS. Herein, the term "CZTS" refers to $Cu_2ZnSnS_4$, and further encompasses copper zinc tin sulfide compositions with a range of stoichiometries, such as but not limited to $Cu_{1.94}Zn_{0.63}Sn_{1.3}S_4$. That is, the molar ratio of the elements can vary from strictly 2 Cu:1 Zn:1 Sn:4S and can also be doped by small amounts of other elements such as sodium or iron.

In one embodiment, the heating is carried out in an open container. By "open container" is meant a container which is open to the atmosphere, that is, contains at least one opening which allows a free vapor communication between the precursor mixture and ambient pressure, thus maintaining the precursor mixture essentially in equilibrium with the ambient pressure. The open container can be made out of any material that is inert to the precursor mixture, such as alumina, aluminum nitride, magnesia, magnesia with alumina, zirconia, zirconia with yttrium oxide, carbon graphite, platinum, and alloys of platinum, gold and rhodium. The open container can be of any shape or size such as combustion boats, crucibles, incineration trays, incineration dishes, and the bottom floor of a oven or furnace.

The precursor mixture can be prepared by combining the individual components either before or after being placed in the container used for heating. The precursors components can be pre-milled separately or after combining. The combining can be done by any means as long as the individual components are homogenized. Suitable combining methods include grinding, shaking, and ball milling. Typically, the particle sizes of precursors are between 350 mesh size and 5 mesh size, or between 200 and 325 mesh. After combining, the precursor mixture can be in powder form or formed into any shape, such as a pressed pellet.

The precursor mixture comprises: i) a copper sulfide, a zinc sulfide, and a tin sulfide; ii) a copper tin sulfide and a zinc sulfide; iii) a copper zinc sulfide and a tin sulfide; or iv) a zinc tin sulfide and a copper sulfide.

By "a copper sulfide" it is meant a composition consisting of copper and sulfur, such as copper (I) sulfide or copper (II) sulfide, or a mixture thereof.

By "a zinc sulfide" it is meant a composition consisting of zinc and sulfur, such as zinc (II) sulfide, or a mixture thereof.

By "a tin sulfide" it is meant a composition consisting of tin and sulfur, such as tin (II) sulfide or tin (IV) sulfide, or a mixture thereof.

By "a copper tin sulfide" it is meant a composition consisting of tin, copper and sulfur, such as a $Cu_2SnS_3$.

By "a copper zinc sulfide" it is meant a composition consisting of zinc, copper and sulfur.

By "a zinc tin sulfide" it is meant a composition consisting of zinc, tin and sulfur.

In one embodiment, the precursor mixture comprises a copper sulfide, a zinc sulfide, and a tin sulfide. In another embodiment, the precursor mixture comprises a copper tin sulfide and a zinc sulfide.

The precursor mixture has a total molar ratio of Cu:Zn:Sn:S of about 2:1:1:4, where the ratio of the Cu, Zn, and Sn can deviate by about 20 molar %. This can occur when some of the Cu, Sn, or Zn metal ions are replaced by a different Cu, Sn, or Zn ion, but only to the extent that the composition remains neutral. For example, the Zn content can be enriched by decreasing the Cu content, producing a Cu:Zn:Sn:S ratio of 1.8:1.2:1:4.

After combining, the precursor mixture is heated in an inert atmosphere. By "inert atmosphere" it is meant an atmosphere that is inert to the precursor mixture, such as helium, neon, argon, krypton, xenon, nitrogen and mixtures thereof. In particular, the inert atmosphere should not contain water, oxygen, or $H_2S$. The inert atmosphere may be streamed or flowed over the open container during the heating step.

The heating is typically carried out at ambient atmospheric pressure.

The total heating time is not critical and depends on the temperature and desired conversion, but is typically from about 0.25 hr to several days. Suitable heating times include 0.25 hr, 1 hour, 2 hours, 6 hours, 12 hours, 24 hours, 2 days, 3 days and 5 days, and any time interval inbetween.

The precursor mixture is heated to a temperature of about 300° C. to about 1000° C., about 400° C. to about 800° C., or about 600° C. to about 800° C. The heating can be performed in any manner, such as in one step, ramping or stepping to the upper temperature, or cycling between the lower and the upper temperature. The heating can be performed using any means, such as in a tube furnace. The precursor mixture can be heated starting at ambient temperature or placed directly at the lower or upper temperature.

The $Cu_2ZnSnS_4$ product is typically cooled to ambient temperature under inert atmosphere to prevent oxidation or hydrolysis. The method can further comprised isolating $Cu_2ZnSnS_4$. This can be done by any known means, including etching with a solvent, typically an acid such as 10% HCl, followed by filtration to remove insoluble impurities, for example SnS.

The CZTS prepared by the method described above can be useful in the fabrication of electronic devices such as photovoltaics.

EXAMPLES

Copper (II) sulfide 200 mesh powder, copper (I) sulfide 200 mesh powder, zinc (II) sulfide 325 mesh powder, tin (II) sulfide 8 mesh powder were purchased from Alfa Aesar (26 Parkridge Rd, Ward Hill, Mass.). Tin (IV) sulfide was purchased from Pfaltz & Bauer Inc. (172 E. Aurora St., Waterbury, Conn.). Copper tin sulfide was prepared from Cu (II) sulfide and Sn (IV) sulfide, according to the procedure described in Fiechter, S.; Martinez, M.; Schmidt, G.; Henrion, W.; Tomm, Y. Hahn-Meitner-Institute, Berlin, Germany. Journal of Physics and Chemistry of Solids (2003), 64(9-10), 1859-1862.

X-ray diffraction patterns were compared to standard patterns of CZTS available from International Centre for Diffraction Data (ICDD), located in Newtown Square, Pa.

Example 1

Copper (II) sulfide (4.35 g, 0.0455 mol), zinc (II) sulfide (2.22 g, 0.0228 mol) and tin (IV) sulfide (4.16 g, 0.0228 mol) were mixed together by shaking for 15 minutes, then placed into a 20 ml alumina boat. The alumina boat was then put into a tube furnace, with a nitrogen flow at ambient temperature. The boat was heated from ambient temperature to 800° C. over 15 minutes, and kept at this temperature for 1 day. The sample was cooled to ambient temperature and ground. The ground sample was placed back into the boat and the tube furnace under nitrogen flow. The heating cycle was then repeated. This procedure was repeated 4 times, for a total heating time of 5 days.

Figure 1B:
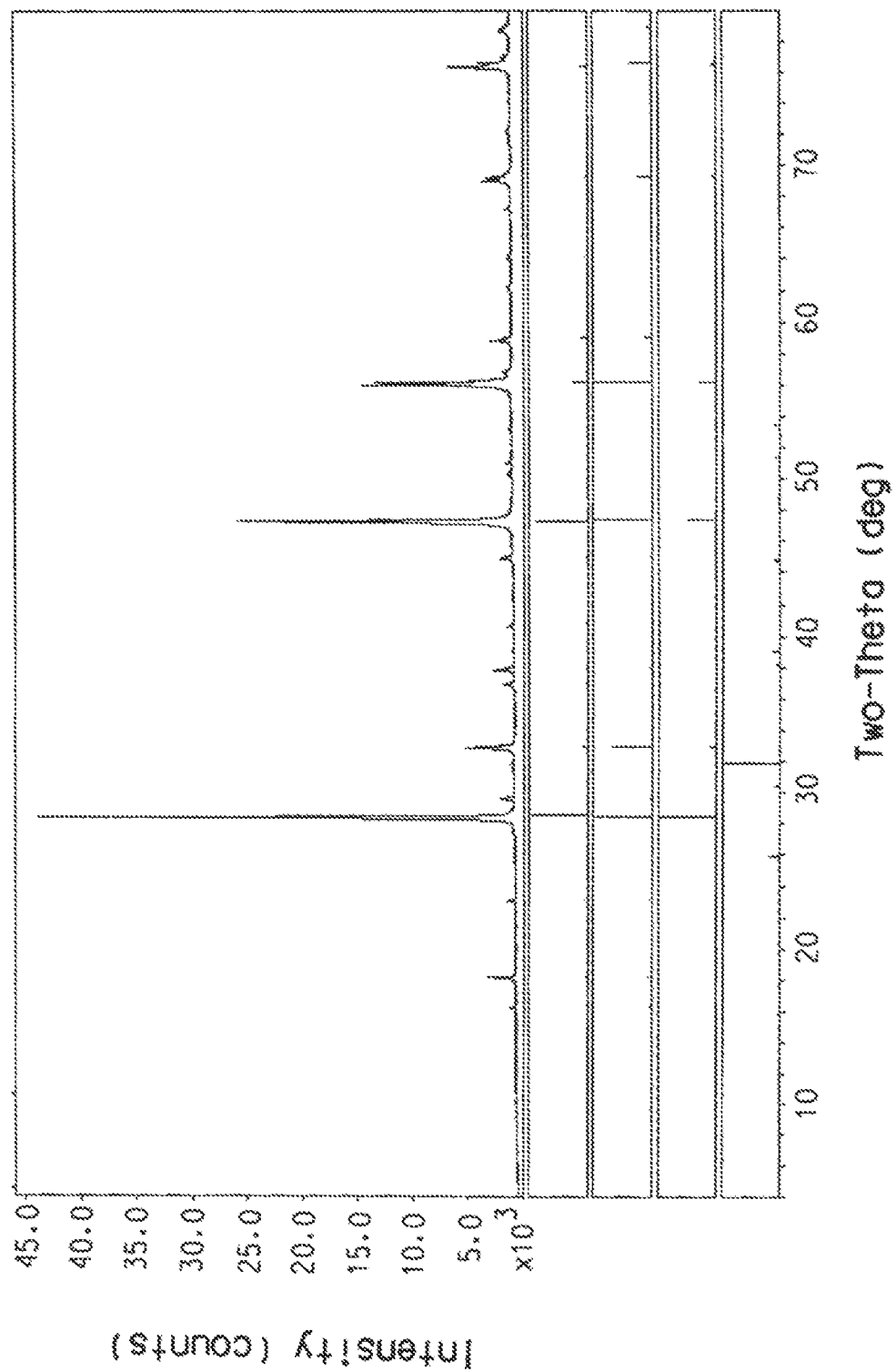

The sample was analyzed by XRD (x-ray powder diffraction) after each heating cycle. The results are shown in FIGS. 1A and 1B. The resulting powder diffraction patterns showed the presence of CZTS in good purity.

Example 2

Copper (II) sulfide (3.26 g, 0.0341 mol), zinc (II) sulfide (1.65 g, 0.0169 mol) and tin (II) sulfide (3.21 g, 0.0213 mol) were mixed together and placed into a 20 ml alumina boat. The boat was then placed in a tube furnace with nitrogen flow at ambient temperature. The boat was heated from ambient temperature to 600° C. over 15 minutes, and kept at this temperature for 1 day. The sample was cooled to ambient temperature and analyzed by XRD. The resulting powder diffraction patterns showed the presence of CZTS in good purity.

Example 3

Copper (II) sulfide (8.7 g, 0.091 mol), zinc (II) sulfide (4.44 g, 0.0456 mol), and tin (IV) sulfide (8.32 g, 0.0456 mol) were mixed together and pressed into 8 pellets, which were then placed into two 20 ml alumina boats and into a tube furnace with nitrogen flow. The boat was heated from ambient temperature to 600° C. over 15 minutes and kept at 600° C. for 3 days. The sample was cooled and analyzed by XRD, which showed the presence of CZTS in good purity.

Example 4

Example 3 was repeated using zinc (II) sulfide (2.29 g, 0.0235 mol) and copper tin sulfide ($Cu_2SnS_3$, 8.037 g, 0.0235 mol). The resulting sample was analyzed by XRD, which showed the presence of CZTS in good purity.

What is claimed is:

1. A method, comprising the steps of:
   a) providing a precursor mixture comprising:
      i) a copper sulfide, a zinc sulfide, and a tin sulfide;
      ii) a copper tin sulfide and a zinc sulfide;
      iii) a copper zinc sulfide and a tin sulfide; or
      iv) a zinc tin sulfide and a copper sulfide;
      wherein the precursor mixture has a total molar ratio of Cu:Zn:Sn:S of about 2:1:1:4; and
   b) heating the precursor mixture in an inert atmosphere to a temperature of about 400° C. to about 800° C.

2. The method of claim 1, further comprising isolating $Cu_2ZnSnS_4$.

3. The method of claim 1, wherein the precursor mixture is heated to a temperature of about 600° C. to about 800° C.

4. The method of claim 1, wherein the precursor mixture is heated for about 6 hours to about 5 days.

5. The method of claim 1, wherein the precursor mixture comprises a copper sulfide, a zinc sulfide, and a tin sulfide.

6. The method of claim 1, wherein the precursor mixture comprises a copper tin sulfide and a zinc sulfide.

7. The method of claim 1, wherein in step b) the inert atmosphere is flowed over the precursor mixture.

8. The method of claim 1, wherein the heating is carried out at ambient atmospheric pressure.

9. The method of claim 1, wherein the heating is carried out in an open container.

* * * * *